United States Patent
Shin et al.

(10) Patent No.: US 9,384,332 B2
(45) Date of Patent: Jul. 5, 2016

(54) WATERMARKING METHOD AND APPARATUS FOR TRACKING HACKED CONTENT AND METHOD AND APPARATUS FOR BLOCKING HACKING OF CONTENT USING THE SAME

(75) Inventors: Jun-bum Shin, Suwon-si (KR); Byung-ho Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 346 days.

(21) Appl. No.: 13/421,181

(22) Filed: Mar. 15, 2012

(65) Prior Publication Data

US 2012/0272327 A1    Oct. 25, 2012

(30) Foreign Application Priority Data

Apr. 22, 2011  (KR) .................. 10-2011-0037987

(51) Int. Cl.
*G06F 11/00*    (2006.01)
*G06F 21/10*    (2013.01)
*G06F 21/16*    (2013.01)

(52) U.S. Cl.
CPC ............... *G06F 21/10* (2013.01); *G06F 21/16* (2013.01)

(58) Field of Classification Search
CPC .................................. G06F 21/10; G06F 21/16
See application file for complete search history.

(56) References Cited

U.S. PATENT DOCUMENTS

| | | | |
|---|---|---|---|
| 7,493,499 B1* | 2/2009 | Deaver et al. | 713/193 |
| 2001/0025342 A1* | 9/2001 | Uchida | 713/186 |
| 2001/0051996 A1* | 12/2001 | Cooper et al. | 709/217 |
| 2002/0078178 A1* | 6/2002 | Senoh | 709/219 |
| 2010/0082478 A1* | 4/2010 | Van Der Veen et al. | 705/39 |

* cited by examiner

*Primary Examiner* — Nirav B Patel
*Assistant Examiner* — Mohammed Waliullah
(74) *Attorney, Agent, or Firm* — Sughrue Mion, PLLC

(57) ABSTRACT

Watermarking method and apparatus for tracking hacking and method and apparatus for blocking hacking of content are provided. The watermarking method includes: obtaining device information from a reception device, with which content is shared, through a determined network channel; generating watermark data based on the obtained device information; and generating watermarked multimedia content by inserting the generated watermark data into content. The method of blocking hacking of content includes: if hacked content is found, detecting watermark data from the hacked content; detecting transmission and reception device information from the detected watermark data; and extracting a progress route of the content based on the detected transmission and reception device information and performing revocation on a hacked device.

15 Claims, 7 Drawing Sheets

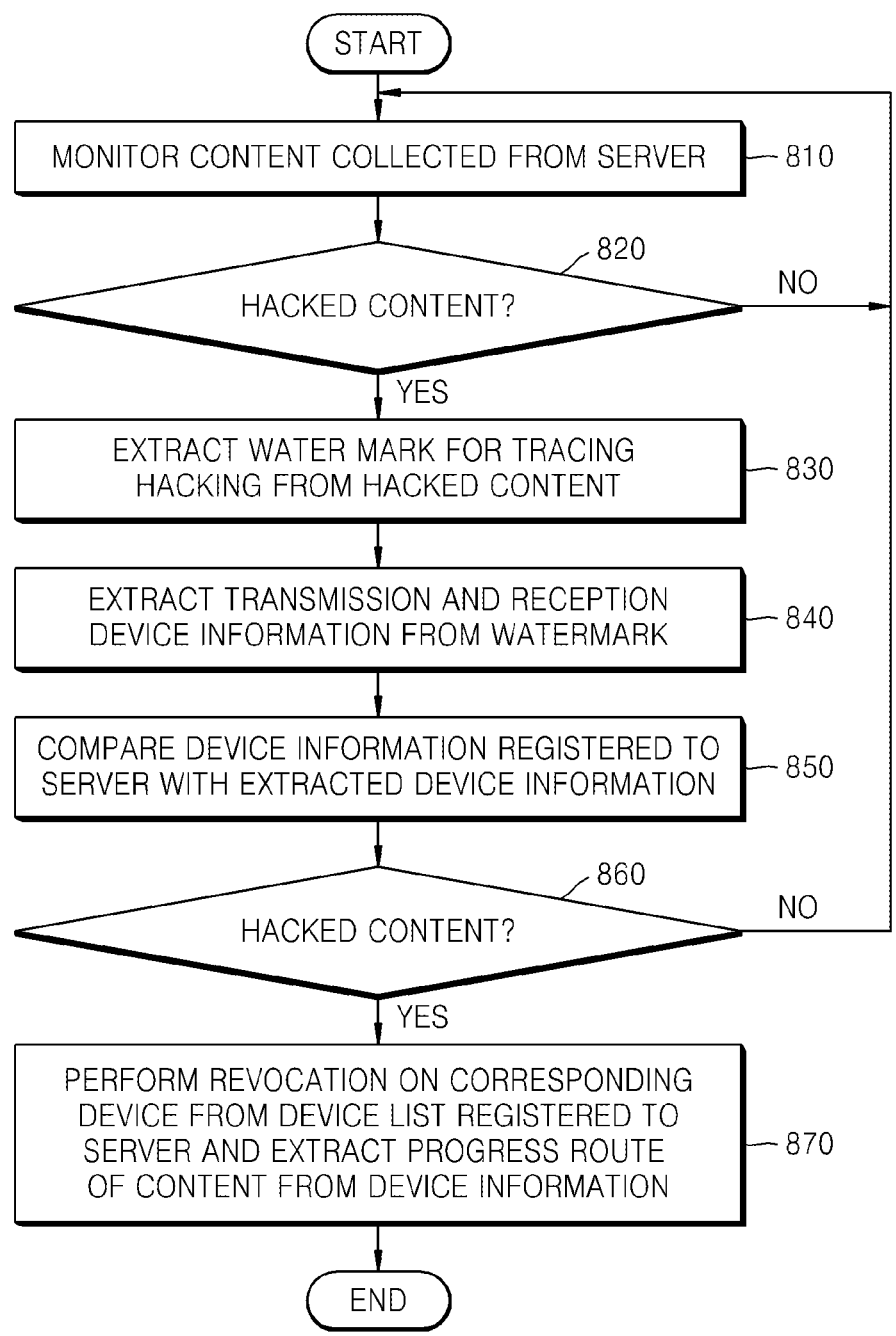

US 9,384,332 B2

WATERMARKING METHOD AND APPARATUS FOR TRACKING HACKED CONTENT AND METHOD AND APPARATUS FOR BLOCKING HACKING OF CONTENT USING THE SAME

CROSS-REFERENCE TO RELATED PATENT APPLICATION

This application claims priority from Korean Patent Application No. 10-2011-0037987, filed on Apr. 22, 2011 in the Korean Intellectual Property Office, the disclosure of which is incorporated herein in its entirety by reference.

BACKGROUND

1. Field

Apparatuses and methods consistent with exemplary embodiments relate to a method and apparatus for tracking hacked content, and more particularly, to a watermarking method and apparatus for tracking hacked content, and a method and apparatus for blocking hacking of content using the same.

2. Description of the Related Art

Due to the rapid development of communication speed and the wide spread use of large-capacity storage media and various portable multimedia reproducing apparatuses, a demand for multimedia content is increasing.

Accordingly, various content providers appear to provide multimedia content in various ways. However, due to their characteristics, copies or modified forms of copies of multimedia content that is the same as original multimedia content may be easily produced and may be easily distributed through various routes. In this regard, hacked content is widely distributed throughout the Internet. Accordingly, technology for basically blocking a leak of content due to hacking is required to protect multimedia content.

SUMMARY

Aspects of one or more exemplary embodiments provide a watermarking method and apparatus for tracking hacked content which may efficiently block hacked content by inserting a watermark for tracking hacking of content in real-time, and a method and apparatus for blocking hacking of content using the same.

According to an aspect of an exemplary embodiment, there is provided a watermarking method for tracking hacking, the method including: obtaining device information from a reception device, with which content is shared, through a determined network channel; generating watermark data based on the received device information; and generating watermarked multimedia content by inserting the generated watermark data into the watermarked multimedia content.

The method may further include the operation of transmitting the watermarked content to the reception device, with which content is shared, through the network channel.

The device information may include a transmission device ID and a reception device ID.

The watermark data may include at least one of transmission and reception device information and content sharing order numbers.

The generating and inserting the watermark data may be performed on each device sharing the content.

The method may further include establishing a look-up table for the obtained device information.

The method may further include forming a watermark domain for inserting the device information.

In the generating the watermarked multimedia content, a specific location for inserting device-related information may be defined in the multimedia content and the watermark data may be inserted into the defined specific location of the multimedia content.

The reception device information may be deleted when re-transmitting.

According to an aspect of another exemplary embodiment, there is provided a method of blocking hacking of content, the method including: monitoring whether content collected in a server is hacked; if hacked content is found, detecting watermark data from the hacked content; detecting user device information from the detected watermark data; and extracting a progress route of the content based on the user device information and performing revocation on a hacked device.

In the extracting the progress route of the content, the progress route for distributing the content may be traced by using the detected user device information.

In the extracting the hacked device, a device corresponding to device information detected more than a determined number of times from the hacked content may be determined as a device used in hacking and revocation of the determined device may be performed.

A device finally recorded may be determined as a device used in hacking to device information recorded to the hacked content and revocation of the determined device may be performed.

The watermark data may include at least one of transmission device information, reception device information, and content sharing order numbers.

According to an aspect of another exemplary embodiment, there is provided a watermarking apparatus for tracking hacking, the apparatus including: a decoder which decodes a content bit stream; a watermark generator which generates watermark data by using device information received from a reception device and its own device information; a watermark inserting unit which generates watermarked content by inserting the watermark data generated by the watermark generator into the content decoded by the decoder; and an encoder which encodes the watermarked content generated by the watermark inserting unit so as to convert the encoded watermarked content into a watermarked content bit stream.

The apparatus may further include a communicating unit which transmits and receives device information to and from a device connected through a determined network and transmits the content bit stream encoded by the encoder to the reception device.

According to an aspect of another exemplary embodiment, there is provided an apparatus for blocking hacking of content, the apparatus including: a monitoring unit which monitors hacked content of content collected in a server; a watermark detector which detects watermark data from the hacked content found by the monitoring unit; a device information extracting unit which extracts user device information from the watermark data detected by the watermark detector; and a hacked content processor which extracts a progress route of content from the device information extracted by the device information extracting unit and performing revocation on a hacked device.

According to an aspect of another exemplary embodiment, there is provided a watermarking method for tracking hacking, the method including: transmitting, by a user device to a content providing apparatus, device information regarding the user device through a network channel; and receiving, by the user device from the content providing apparatus, watermarked multimedia content generated by inserting watermark data into the content, the watermark data being generated based on the transmitted device information.

BRIEF DESCRIPTION OF THE DRAWINGS

The above and other features and advantages will become more apparent by describing in detail exemplary embodiments with reference to the attached drawings in which:

FIG. 8 is a flowchart illustrating a method of blocking hacking of content in detail, according to an exemplary embodiment.

DETAILED DESCRIPTION OF THE INVENTION

Hereinafter, one or more exemplary embodiments will be described in detail with reference to the accompanying drawings.

Figure 1:
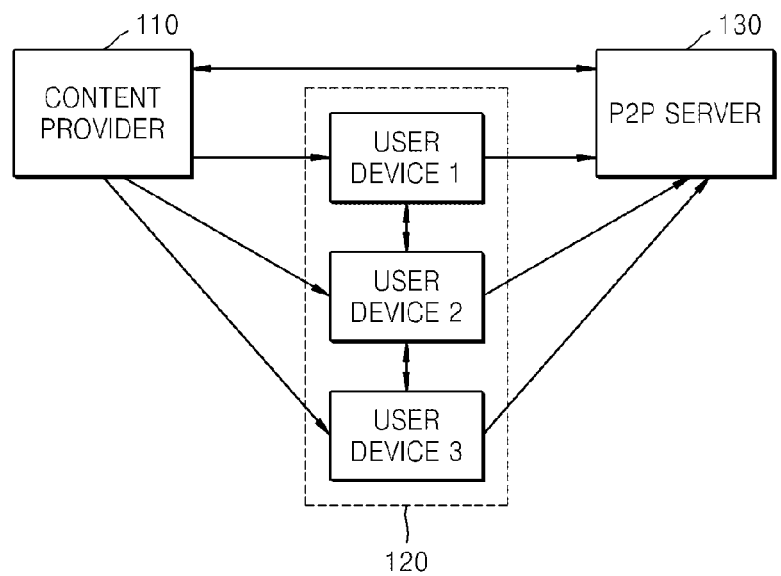
FIG. 1 is a block diagram of a network system for tracking hacking, according to an exemplary embodiment.

FIG. 1 is a block diagram of a network system for tracking hacking, according to an exemplary embodiment.

The network system of FIG. 1 includes a content provider 110, a client network 120, and a peer-to-peer (P2P) server 130.

The content provider 110 provides content to one or more user devices included in the client network 120 managed by the content provider 110, monitors whether content collected in the P2P server 130 is hacked (i.e., copied, modified, illegally distributed, etc.), detects device-related information from a watermark inserted into hacked content when hacking occurs, extracts a progress route of the content from the device-related information, and performs device revocation for a hacked user device.

The client network 120 includes one or more user devices, e.g., user devices 1, 2, and 3. Each of the user devices communicates content and device information with each other through a determined network channel and inserts a watermark corresponding to transmitted and received device information into the content received from the content provider 110. Also, each of the user devices uploads content to the P2P server 130.

The P2P server 130 collects content from the one or more user devices in the client network 120.

Figure 2:
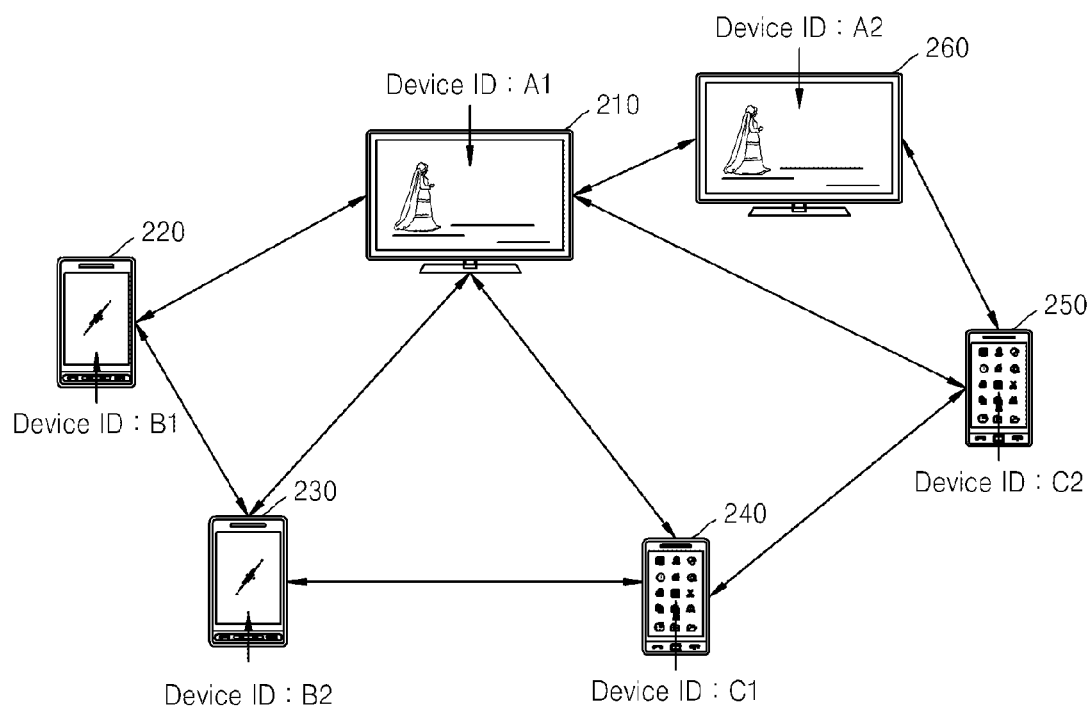
FIG. 2 illustrates a client network system of FIG. 1, according to an exemplary embodiment.

FIG. 2 illustrates a client network system of FIG. 1, according to an exemplary embodiment.

The client network system of FIG. 2 includes a plurality of user devices, namely, user device 1 210, user device 2 220, user device 3 230, user device 4 240, user device 5 250, and user device 6 260, each of which is connected to each other by a determined bi-directional secured channel so as to share content and device information with each other. Also, each user device includes a device ID.

For example, the user device 1 210 includes a device ID "A1", the user device 2 220 includes a device ID "B1", the user device 3 230 includes a device ID "B2", the user device 4 240 includes a device ID "C1", the user device 5 250 includes a device ID "C2", and the user device 6 260 includes a device ID "A2".

Also, each user device transmits and receives device information to and from an opposite user device, with which content is shared, and transmits a content sharing order to the opposite user device.

Each user device inserts a watermark corresponding to transmitted and received device information or DRM key information into content and encodes the watermarked content. Here, a watermark domain, which may insert device information, is formed in each user device and a location for inserting the device information is defined in the content.

For example, the user device 1 210 receives the device ID B1 from the user device 2 220 through the bi-directional channel and transmits its own device ID A1 to the user device 2 220. Then, the user devices 1 and 2 210 and 220 generate watermark data based on at least one of an own ID, an opposite device ID, and content sharing order numbers, and insert the generated watermark data into content to be shared.

Consequently, watermark information corresponding to transmitted and received device information is inserted into content so that the content provider 110 may detect a device used in hacking by using the watermark information when hacking occurs.

Figure 3:
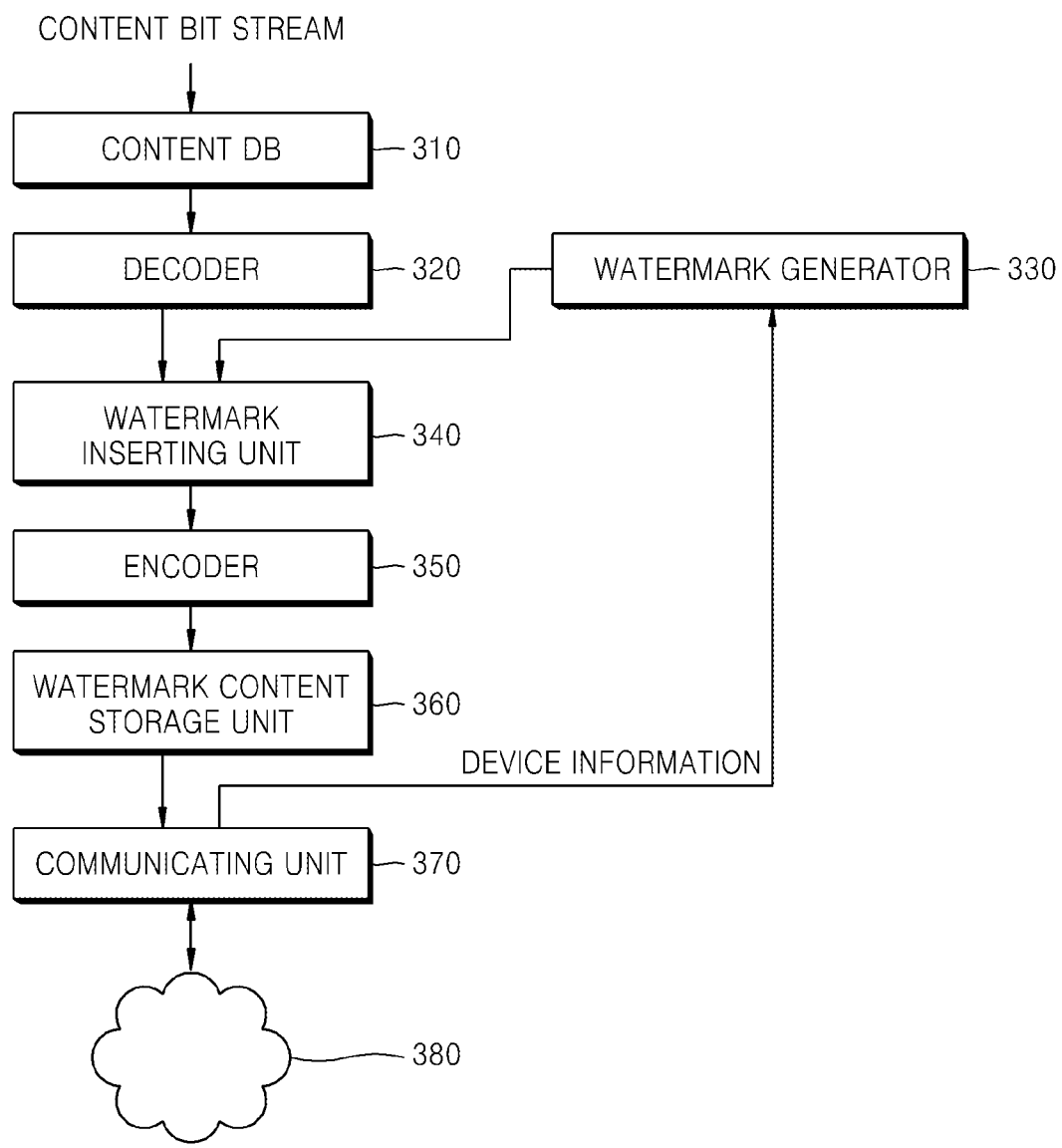
FIG. 3 is a block diagram of a user device that realizes watermarking technology for tracking hacking, according to an exemplary embodiment.

FIG. 3 is a block diagram of a user device that realizes watermarking technology for tracking hacking, according to an exemplary embodiment.

The user device of FIG. 3 includes a content database (DB) 310, a decoder 320, a watermark generator 330, a watermark inserting unit 340, an encoder 350, a watermark content storage unit 360, and a communicating unit 370.

The content DB 310 stores a content bit stream received from the content provider 110. Here, the content DB 310 may be, for example, a magnetic recording medium such as a hard disk, a non-volatile memory such as EEPROM or a flash memory, a volatile memory, etc. However, it is understood that one or more other exemplary embodiments are not limited thereto.

The decoder 320 decodes the content bit stream stored in the content DB 310.

The watermark generator 330 receives device information of a reception device, with which content is shared, from the communicating unit 370 through a determined network and generates watermark data by using the received device information and its own device information.

For example, the watermark generator 330 determines a watermark pattern, converts the watermark pattern into an image data form, and thereby generates watermark data. The watermark pattern may be determined based on an original image or information relating to reproducing of the original image. For example, the watermark pattern may indicate transmission device information and reception device information. The watermark pattern may be generated in the form of a random number sequence.

The watermark inserting unit 340 inserts the watermark data generated by the watermark generator 330 into the content data decoded by the decoder 320 (e.g., in real time) and generates watermarking content. For example, a watermark is inserted into pixels in a block unit by using watermarking technology based on a spatial domain. In general, the watermark may be divided into a robust watermark, a semi watermark, and a fragile watermark according to an external attack or the degree of enduring transformation.

The encoder 350 encodes the watermarked content and converts the encoded content into a watermarked content bit stream.

The watermark content storage unit 360 stores the watermarked content bit stream encoded by the encoder 350. Here, the watermark content storage unit 360 may be, for example, a magnetic recording medium such as a hard disk, a non-volatile memory such as EEPROM or a flash memory, a volatile memory, etc. However, it is understood that one or more other exemplary embodiments are not limited thereto The communicating unit 370 transmits the content bit stream to a reception user device connected to a security network 380 for sharing content, transmits its own device information to the reception user device, receives reception device information from the reception user device, and inputs the reception device information to the watermark generator 330.

According to the present exemplary embodiment, the user device may insert watermark information for tracking hacking into content in real time.

Figure 4:
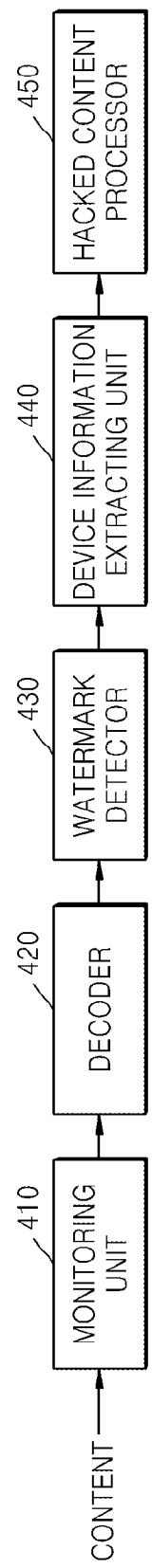
FIG. 4 is a block diagram of an apparatus for blocking hacking of content of a content provider, according to an exemplary embodiment.

FIG. 4 is a block diagram of an apparatus for blocking hacking of content of a content provider, according to an exemplary embodiment.

The apparatus of FIG. 4 includes a monitoring unit 410, a decoder 420, a watermark detector 430, a device information extracting unit 440, and a hacked content processor 450.

The monitoring unit 410 monitors whether a multimedia content bit stream collected from a server is hacked.

The decoder 420 decodes the hacked multimedia content bit stream found by the monitoring unit 410.

The watermark detector 430 detects watermark data from the content decoded by the decoder 420.

The device information extracting unit 440 extracts device information from the watermark data detected by the watermark detector 430. Here, the device information includes at least one of a transmission device ID, a reception device ID, and a content sharing order.

The hacked content processor 450 extracts a progress route of content from the extracted device information and performs hacked device revocation.

Figure 5:
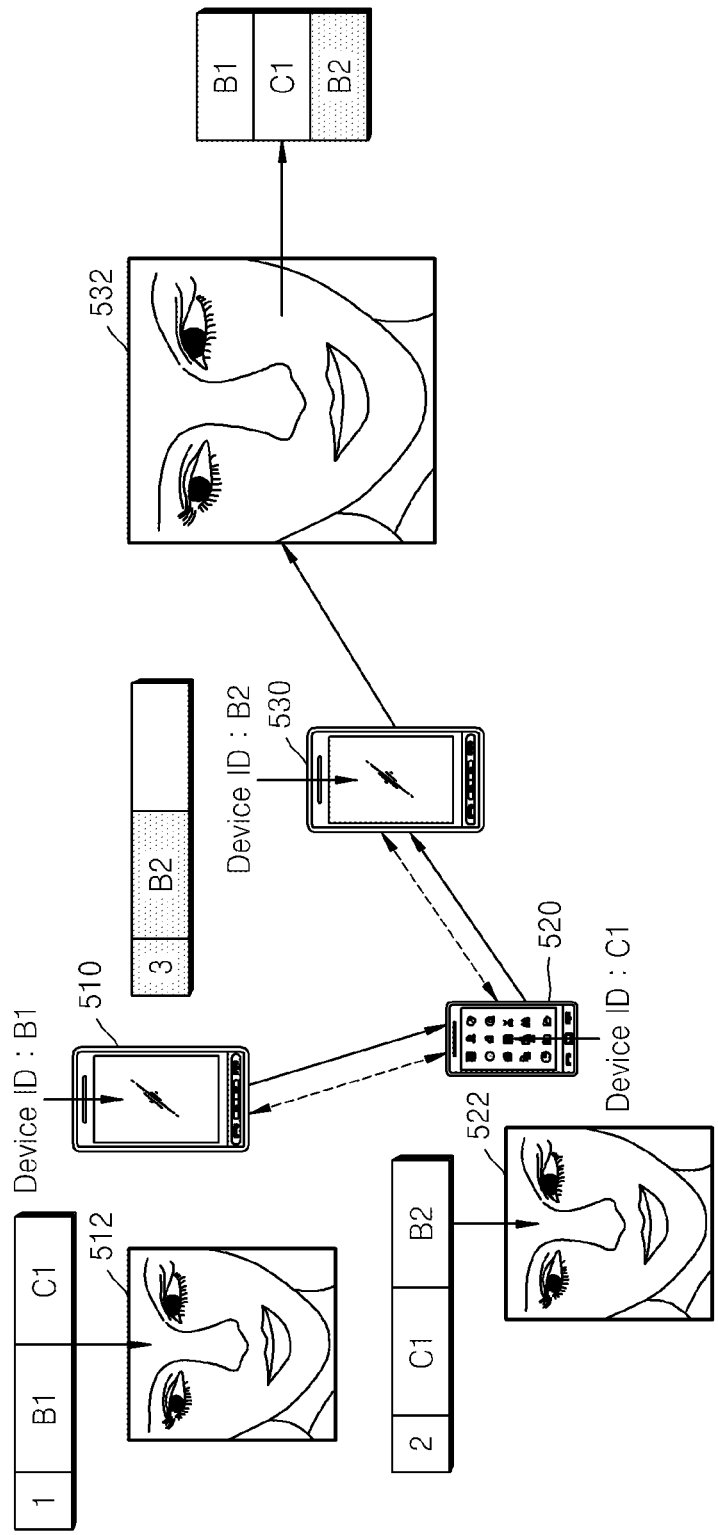
FIG. 5 is a diagram for explaining watermarking technology for tracking hacking in user devices of FIG. 2, according to an exemplary embodiment.

FIG. 5 is a diagram for explaining watermarking technology for tracking hacking in the user devices of FIG. 2, according to an exemplary embodiment.

A first user device 510, a second user device 520, and a third user device 530 share content and device information with each other through a determined bi-directional channel. Here, the first user device 510 includes a device ID "B1", the second user device 520 includes a device ID "C1", and the third user device 530 includes a device ID "B2."

First, the first user device 510 generates watermark data based on a content sharing order "1", transmission device information "B1", and reception device information "C1", inserts the watermark data into content 512, and transmits the watermarked content to the second user device 520.

Then, the second user device 520 receives the watermarked content 522 from the first user device 510, generates watermark data based on a content sharing order "2", transmission device information "C1", and reception device information "B2", inserts the watermark data to the content 522 received from the first user device 510, and transmits the watermarked content to the third user device 530. Here, the transmission device information "C1" is already recorded to the content shared with the first user device 510 and thus may be omitted, though it is understood that another exemplary embodiment is not limited thereto.

Then, the third user device 530 receives the watermarked content 532 from the second user device 520, generates watermark data based on a content sharing order "3" and transmission device information "B2", and inserts the watermark data to the content 532 received from the second user device 520. In the content 532, device information "B1", "C1", and "B2" of the first user device 510, the second user device 520, and the third user device 530 is sequentially recorded according to the content sharing order.

As another example, when a transmission device content to a reception device, the reception device information may be omitted.

When it is assumed that the content of the third user device 530 is hacked, the third user device 530 may be identified as a device used in hacking with reference to the transmission device information "B2" finally recorded to the hacked content 532.

According to the present exemplary embodiment, transmission and reception-related watermark information in each user device is inserted into content and thus, when information is leaked from a specific user device, the corresponding user device may be revoked.

Figure 6:
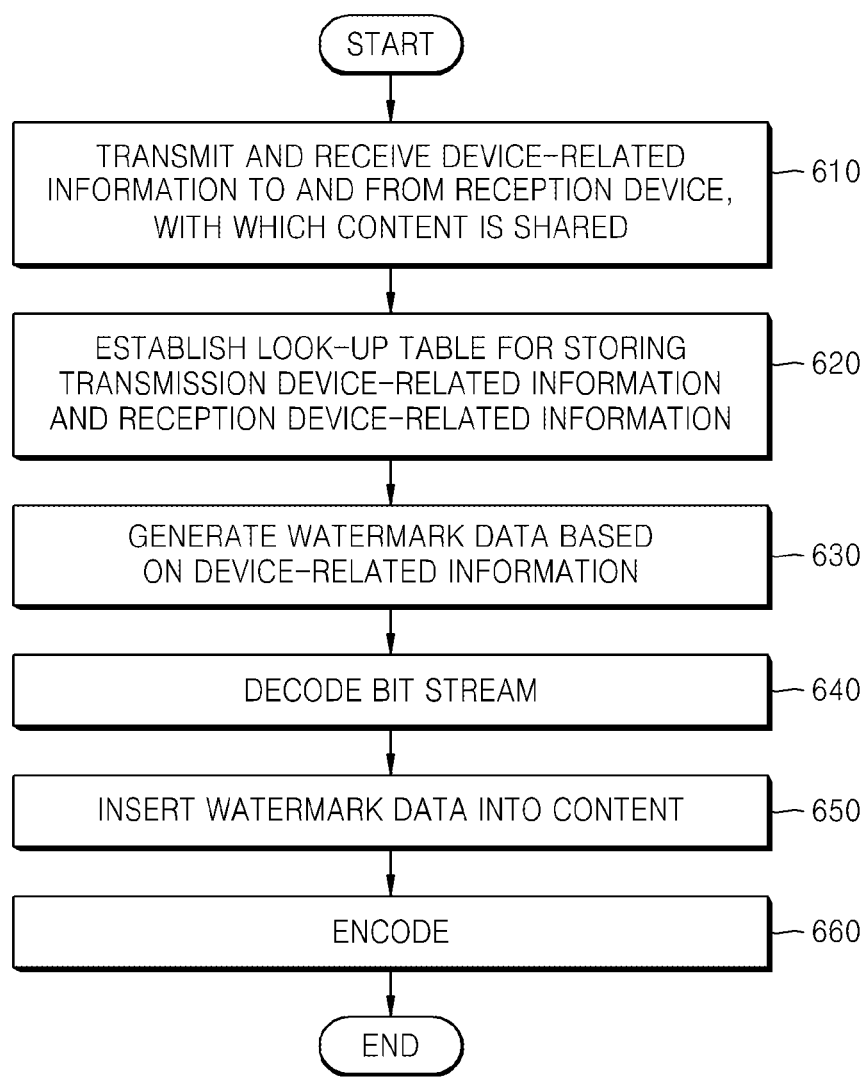
FIG. 6 is a flowchart illustrating a watermarking method for tracking hacking in a user device, according to an exemplary embodiment.

FIG. 6 is a flowchart illustrating a watermarking method for tracking hacking in a user device, according to an exemplary embodiment.

A user device transmits and receives device-related information to and from a reception device, with which content is shared, through a secured network channel, in operation 610. For example, the device-related information may include a transmission device ID and a reception device ID. However, another exemplary embodiment is not limited thereto. Furthermore, the user device may transmit device-related information to the reception device at a later time, e.g., concurrently with or included in content shared with the reception device.

The user device establishes or updates a look-up table for storing transmission device-related information and reception device-related information, in operation 620.

The user device generates watermark data based on the reception device-related information, in operation 630. For example, a watermark domain for inserting the device-related information may be formed. The watermark domain may use at least one of spatial separation, time separation, and frequency separation. Also, watermark configuration information includes at least one of transmission device information, reception device information, and content sharing order numbers.

The user device decodes a content bit stream provided from a content provider, in operation 640.

The user device generates watermarked content by inserting the watermark data into the decoded content, in operation 650. For example, a specific location in the content, to which the device-related information is inserted, is defined and the watermark data is inserted into the defined specific location in the content.

The user device converts the watermarked content into a watermarked content bit stream by encoding the watermarked content, in operation 660.

According to the present exemplary embodiment, a watermark for tracking hacking is inserted into content in real time and thus hacking of content may be efficiently blocked.

Figure 7:
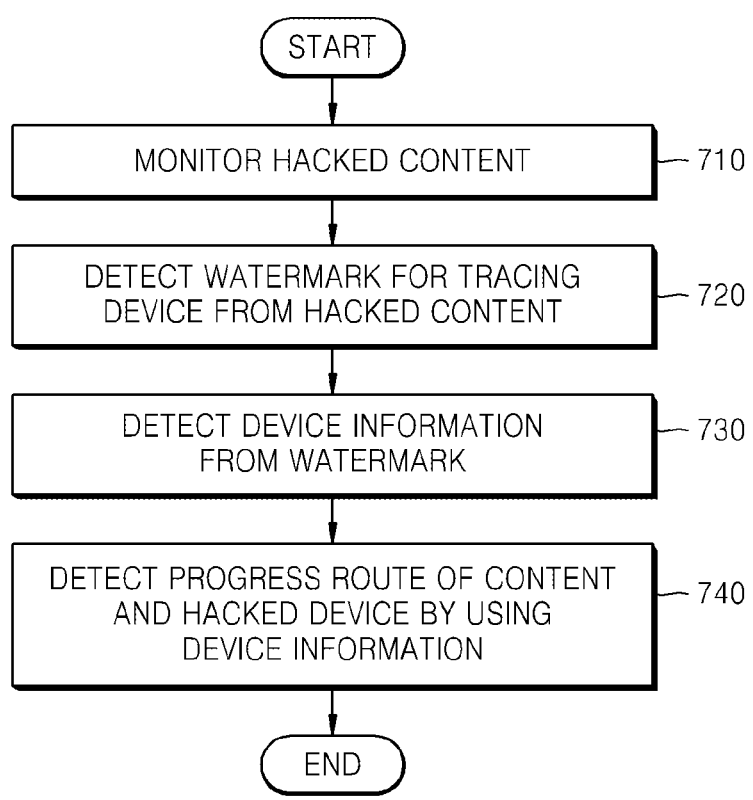
FIG. 7 is a flowchart illustrating an overall method of blocking hacking of content, according to an exemplary embodiment.

FIG. 7 is a flowchart illustrating an overall method of blocking hacking of content by a content provider 110 according to an exemplary embodiment.

Whether the content collected in a server (e.g., a P2P server 130) is hacked is monitored, in operation 710.

Here, when hacked content is found, watermark data is detected from the hacked content, in operation 720.

User device information (e.g., transmission and reception device information) is detected from the detected watermark data, in operation 730.

Then, a progress route of content is extracted by using the transmission and reception device information and hacked device revocation is performed, in operation 740.

FIG. 8 is a flowchart illustrating a method of blocking hacking of content by a content provider 110 in detail, according to an exemplary embodiment.

Whether the content collected in a server (e.g., a P2P server 130) is hacked is monitored, in operation 810.

Whether hacked content is found is checked, in operation 820.

If hacked content is found, a plurality of pieces of watermark data for tracking hacking is detected, in operation 830.

User device information (e.g., transmission and reception device information) is extracted from the pieces of watermark data, in operation 840. For example, the transmission and reception device information includes at least one of a transmission device ID, a reception device ID, and content sharing order numbers.

A user device list registered to a server is compared with the extracted transmission and reception device information, in operation 850. For example, a user device ID list registered to a server is compared with an extracted user device ID.

According to the result of comparing the user device list with the extracted transmission and reception device information, whether a user device is a hacked device is checked, in operation 860. That is, if the extracted user device ID matches with the user ID registered to a server, a user device corresponding to the extracted user device ID is determined as a hacked device.

The hacked device is revoked from the user device list registered to the server and a progress route for distributing the content is extracted by using the device information, in operation 870.

As an example of device revocation, a user device ID detected more than a predetermined or statistically determined number of times from the hacked content is determined as a user device used in hacking and the user device revocation is performed.

As another example of device revocation, revocation of a user device finally recorded to the device information recorded to the hacked content is performed.

Consequently, according to exemplary embodiments, hacked content is efficiently blocked by the watermark for tracking hacking inserted into content.

One or more exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Moreover, one or more components of the above described devices can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A watermarking method for tracking hacking, the method comprising:
    obtaining content sharing order information, wherein the content sharing order information indicates a sequential order in which content has been previously shared by a plurality of different devices;
    generating watermark data comprising the obtained content sharing order information;
    and
    generating watermarked multimedia content by inserting the generated watermark data into the content,
    wherein the generated watermarked multimedia content comprises device information of each of the plurality of different devices which previously shared the content.

2. The method of claim 1, further comprising obtaining device information regarding a device with which content is shared through a network channel, wherein the obtaining the device information comprises receiving the device information from the device through the network channel.

3. The method of claim 1, further comprising obtaining device information regarding a device with which content is shared through a network channel, wherein the obtaining the device information comprises receiving first device information from the For discussion purposes only do not enter device through the network channel and transmitting second device information to the device through the network channel.

4. The method of claim 1, further comprising transmitting the watermarked content to a reception device, with which the content is shared, through the network channel.

5. The method of claim 1, further comprising obtaining device information with which content is shared through a network channel, wherein the device information comprises at least one of a transmission device ID corresponding to a transmission device from which the content is transmitted and a reception device ID corresponding to a reception device to which the content is transmitted.

6. The method of claim 1, wherein the watermark data comprises at least one of transmission device information corresponding to a transmission device from which the content is transmitted and reception device information corresponding to a reception device to which the content is transmitted.

7. The method of claim 1, wherein the generating the watermarked data and the generating the watermarked multimedia content are performed by each subsequent device sharing the content.

8. The method of claim 1, further comprising:
    obtaining device information with which content is shared through a network channel;
    and
    establishing a look-up table for the obtained device information.

9. The method of claim 1, further comprising forming a watermark domain for inserting the device information.

10. The method of claim 1, wherein the generating the watermarked multimedia content comprises inserting the generated watermark data into a specific location for inserting device-related information in the content.

11. The method of claim 6, wherein reception device information corresponding to the reception device is omitted from the generated watermark data.

12. A watermarking apparatus for tracking hacking, the apparatus comprising:
 a decoder which decodes content of a content bit stream;
 a watermark generator which generates watermark data by including sharing order information, wherein the content sharing order information indicates a sequential order in which content has been previously shared by a plurality of different devices;
 a watermark inserting unit which generates watermarked content by inserting the watermark data generated by the watermark generator into the content decoded by the decoder,
 the generated watermarked content comprising device information of each of the plurality of different devices which previously shared the content; and
 an encoder which encodes the watermarked content generated by the watermark inserting unit to generate a watermarked content bit stream.

13. The apparatus of claim 12, further comprising a communicating unit which transmits device information to the reception device connected through a determined network and transmits the generated watermarked content bit stream to the reception device.

14. A watermarking method for tracking hacking, the method comprising:
 transmitting, by a user device to a content providing apparatus, device information regarding the user device through a network channel; and
 receiving, by the user device from the content providing apparatus, watermarked multimedia content generated by inserting watermark data into the content, the watermark data being generated by including content order sharing information,
 wherein the content sharing order information indicates a sequential order in which the content has been previously shared by a plurality of different devices, and
 wherein the generated watermarked multimedia content comprises device information of each of the plurality of different devices which previously shared the content.

15. A non-transitory computer-readable recording medium having embodied thereon a program for executing a method comprising:
 obtaining content sharing order information, wherein the content sharing order information indicates a sequential order in which content has been previously shared by a plurality of different devices;
 generating watermark data comprising the obtained content sharing order information; and
 generating watermarked multimedia content by inserting the generated watermark data into the content,
 wherein the generated watermarked multimedia content comprises device information of each of the plurality of different devices which previously shared the content.

* * * * *